US009020701B2

(12) United States Patent
Miichi et al.

(10) Patent No.: US 9,020,701 B2
(45) Date of Patent: Apr. 28, 2015

(54) INFORMATION DISPLAY DEVICE AND COURSE SETTING METHOD

(71) Applicant: FURUNO Electric Company Limited, Nishinomiya, Hyogo (JP)

(72) Inventors: Tadahiro Miichi, Nishinomiya (JP); Tatsuya Asahara, Nishinomiya (JP); Kazutoshi Shimo, Nishinomiya (JP)

(73) Assignee: FURUNO Electric Company Limited, Hyogo (JP)

( * ) Notice: Subject to any disclaimer, the term of this patent is extended or adjusted under 35 U.S.C. 154(b) by 0 days.

(21) Appl. No.: 14/258,386

(22) Filed: Apr. 22, 2014

(65) Prior Publication Data

US 2014/0324292 A1 Oct. 30, 2014

(30) Foreign Application Priority Data

Apr. 26, 2013 (JP) ................................. 2013-093402

(51) Int. Cl.
*B62D 6/00* (2006.01)
*G01C 21/20* (2006.01)
*B63H 25/04* (2006.01)
*G09B 29/10* (2006.01)
*B63B 49/00* (2006.01)

(52) U.S. Cl.
CPC ................ *G01C 21/20* (2013.01); *B63H 25/04* (2013.01); *B63B 49/00* (2013.01); *G01C 21/203* (2013.01); *G09B 29/106* (2013.01)

(58) Field of Classification Search
CPC .............. B62D 6/00; B62D 1/00; B62D 1/24; B62D 15/02; B62D 15/025; B62D 1/28; G05D 1/021; G05D 1/0212; B63B 49/00; B63H 25/04; G09B 29/106; G01C 21/203; G01C 21/20

USPC ...................................................... 701/23, 41
See application file for complete search history.

(56) References Cited

U.S. PATENT DOCUMENTS

| 6,876,920 B1 * | 4/2005 | Mailer .......................... 701/470 |
| RE41,358 E * | 5/2010 | Heiniger et al. ................ 701/23 |
| 8,599,159 B2 * | 12/2013 | Sugeda et al. ................. 345/173 |
| 8,791,956 B2 * | 7/2014 | Ando et al. .................... 345/619 |

(Continued)

FOREIGN PATENT DOCUMENTS

| JP | 10-236394 A | 9/1998 |
| JP | 3535887 B | 3/2004 |

*Primary Examiner* — James Trammell
*Assistant Examiner* — Rodney Butler
(74) *Attorney, Agent, or Firm* — Global IP Counselors, LLP

(57) ABSTRACT

An information display device includes a preset course information receiver, a symbol display processor, a change mode execution processor, and a preset course information transmitter. The preset course information receiver receives preset course information from an automatic steering device. The symbol display processor displays a symbol representing a preset course on a display screen to correspond to position information of a mobile body based on the preset course information. The change mode execution processor executes a change mode for changing the preset course information based on a fact that the symbol has been designated with a manipulation component. The preset course information transmitter transmits the preset course information changed during the change mode to the automatic steering device. The symbol display processor changes an orientation of the symbol representing the preset course according to a change operation in the preset course information with the manipulation component during the change mode.

16 Claims, 11 Drawing Sheets

(56) References Cited

U.S. PATENT DOCUMENTS

| | | | |
|---|---|---|---|
| 8,868,329 B2* | 10/2014 | Ikeda et al. | 701/400 |
| 2002/0177944 A1* | 11/2002 | Ihara et al. | 701/208 |
| 2013/0124041 A1* | 5/2013 | Belser et al. | 701/41 |
| 2014/0058670 A1* | 2/2014 | Lu | 701/533 |
| 2014/0129976 A1* | 5/2014 | Beaurepaire et al. | 715/788 |

* cited by examiner

INFORMATION DISPLAY DEVICE AND COURSE SETTING METHOD

CROSS-REFERENCE TO RELATED APPLICATIONS

This application claims priority to Japanese Patent Application No. 2013-093402 filed on Apr. 26, 2013. The entire disclosure of Japanese Patent Application No. 2013-093402 is hereby incorporated herein by reference.

BACKGROUND

1. Field of the Invention

The present invention relates to an information display device that displays position information about a mobile body along with map information on the display screen of a display component, and to a course setting method for setting a preset course in an automatic steering device.

2. Background Information

Ships, aircraft, and other such mobile bodies are sometimes equipped with information display devices or automatic steering devices. An information display device displays position information about a mobile body along with map information on the display screen of a display component. An automatic steering device, meanwhile, performs steering automatically so that the mobile body will be headed on a specific course.

Japanese Unexamined Patent Application Publication No. H10-236394 (Patent Literature 1) discloses a configuration including a dial key as an example of an automatic steering device. With this automatic steering device, the course of a ship can be set by turning a dial key to input numerical values below the decimal point.

Japanese Patent No. 3,535,887 (Patent Literature 2) discloses a configuration in which a veering point is found along a current heading from the turn rate and vessel speed, and the veering is commenced when the host vessel has crossed this veering point and passed a veering line parallel to the new heading.

SUMMARY

With the conventional automatic steering device discussed above, however, if an obstacle is discovered in the course of the mobile body, for example, during autopilot operation in which the vessel is steered automatically based on a preset course, the preset course cannot be changed without operating the manipulation component of the automatic steering device. More specifically, the user has to change the preset course by operating a manipulation key provided to the automatic steering device, the dial key used as an example in the above-mentioned Patent Literature 1, or the like.

The user mainly watches the information display device during autopilot operation. Nevertheless, if the need to change the preset course should arise as mentioned above, the user has to check the preset course digitally displayed on the display component of the automatic steering device, and change the preset course by operating the manipulation component of the automatic steering device. Therefore, changing the preset course entailed considerable work.

Also, the preset course displayed on the display component of the automatic steering device is such that the absolute bearing with respect to north is given as a digital value, for example. Accordingly, if there is a need to change the preset course as mentioned above, it can be difficult to determine the proper preset course intuitively. Therefore, it is often the case that a preset course is not changed properly, and if this happens, there is the danger that the mobile body will collide with the obstacle, so the preset course must be readjusted. This makes the job of changing the preset course that much harder.

The present invention is conceived in light of the above situation, and it is an object thereof to provide an information display device and a course setting method with which the work of changing the preset course in an automatic steering device can be carried out more smoothly. It is a further object of the present invention to provide an information display device and a course setting method with which there is less risk that a mobile body will collide with an obstacle.

The information display device pertaining to the present invention is configured to display position information of a mobile body along with map information on a display screen of a display component, and is configured to transmit a signal to an automatic steering device based on an operation of a manipulation component. The information display device includes a preset course information receiver, a symbol display processor, a change mode execution processor, and a preset course information transmitter. The preset course information receiver is configured to receive preset course information from the automatic steering device. The symbol display processor is configured to display a symbol representing a preset course on the display screen so as to correspond to the position information of the mobile body based on the preset course information received by the preset course information receiver. The change mode execution processor is configured to execute a change mode for changing the preset course information based on a fact that the symbol displayed on the display screen has been designated with the manipulation component. The preset course information transmitter is configured to transmit the preset course information changed during the change mode to the automatic steering device. The symbol display processor is further configured to change an orientation of the symbol representing the preset course according to a change operation in the preset course information with the manipulation component during the change mode.

With this configuration, the preset course information from the automatic steering device is received by the information display device, and the symbol representing the preset course is displayed on the display screen of the information display device displaying the position information of the mobile body along with the map information so as to correspond to the position information of the mobile body. Accordingly, the user can intuitively grasp the preset course of the automatic steering device by looking at the display screen of the information display device.

Also, the user can easily execute the change mode for changing the preset course information by using the manipulation component to designate the symbol displayed on the display screen. The user can perform the job of changing the preset course information during the change mode, and thereby transmit this preset course information to the automatic steering device and change the preset course of the automatic steering device. During the change mode, if the user performs the change operation in the preset course information with the manipulation component, the orientation of the symbol representing the preset course will change, which makes it easy for the user to intuitively grasp the preset course of the automatic steering device after the change.

Thus, the user can intuitively grasp the preset course of the automatic steering device before and after the change by looking at the symbol displayed on the display screen of the information display device. Accordingly, the work entailed by changing the preset course in the automatic steering device can be carried out more smoothly than with a conventional configuration in which the preset course is changed by operating the manipulation component of the automatic steering device.

Also, if an obstacle should be discovered in the course of the mobile body, for example, the user can easily execute the change mode by using the manipulation component to designate the symbol displayed on the display screen, and can change to the proper preset course information while looking at the symbol on the display screen, which is readily and intuitively understood. Consequently, the change to the proper preset course information can be made in a short time, so there is less danger that the mobile body will collide with the obstacle.

Also other objects, features, aspects and advantages of the present disclosure will become apparent to those skilled in the art from the following detailed description, which, taken in conjunction with the annexed drawings, discloses one embodiment of the information display device and the course setting method.

BRIEF DESCRIPTION OF THE DRAWINGS

Referring now to the attached drawings which form a part of this original disclosure.

DETAILED DESCRIPTION OF EMBODIMENTS

A selected embodiment will now be explained with reference to the drawings. It will be apparent to those skilled in the art from this disclosure that the following descriptions of the embodiment are provided for illustration only and not for the purpose of limiting the invention as defined by the appended claims and their equivalents.

Figure 1:
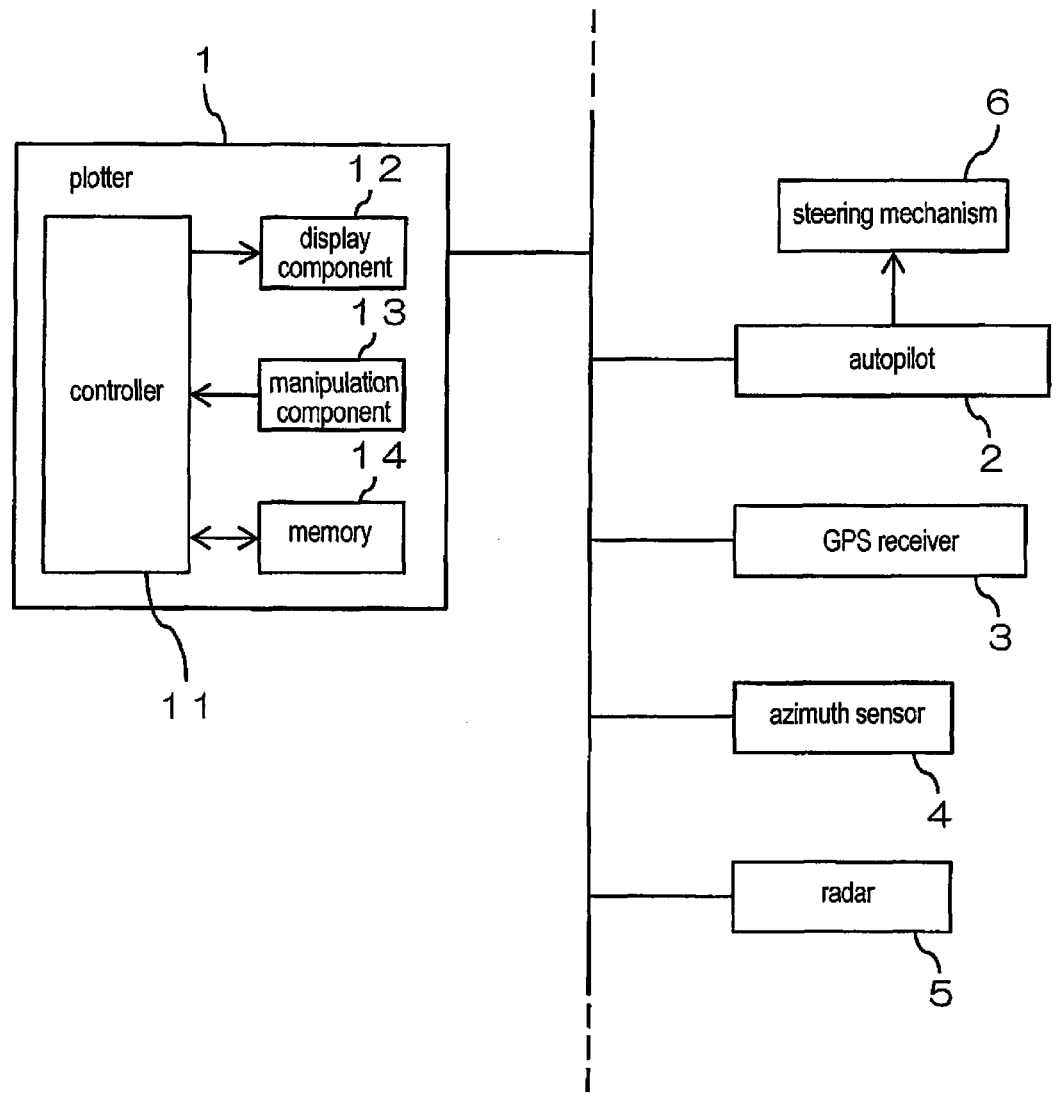
FIG. 1 is a block diagram of a configuration example of an automatic steering system to which is applied the information display device pertaining to an embodiment of the present invention.

FIG. 1 is a block diagram of a configuration example of an automatic steering system to which is applied the information display device pertaining to an embodiment of the present invention. This automatic steering system is made up of a plotter 1, an autopilot 2, a GPS (global positioning system) receiver 3, an azimuth sensor 4, and a radar 5, which are connected so that they can communicate with one another. This system is installed in a ship, an aircraft, or any of various other kinds of mobile body. A ship will be described below as an example of a mobile body.

The plotter 1 is an information display device including a controller 11, a display component 12, a manipulation component 13, and a memory 14. The controller 11 includes a CPU (central processing unit), for example, and controls the operation of the plotter 1 by executing a program. The display component 12 is a liquid crystal display device, for example. The display component 12 displays position information about the mobile body along with map information on a display screen.

The manipulation component 13 is used by the user in order to make inputs related to the operation of the plotter 1, or to send signals to the autopilot 2. The memory 14 is made up of a RAM (random access memory) and a ROM (read-only memory), for example, and stores information that is needed for the operation of the plotter 1.

The autopilot 2 automatically performs steering so that the mobile body is headed on a specific course. The autopilot 2 is connected to a steering mechanism 6 for steering the mobile body, and the operation of this steering mechanism 6 is controlled by the autopilot 2. The autopilot 2 can control not only the steering mechanism 6, but also an engine (not shown), and can control the speed of the mobile body in addition to its course.

The autopilot 2 in this embodiment can control the operation of the steering mechanism 6 by switching between a plurality of modes. These modes include, for example, first automatic steering operation (auto mode) in which the mobile body is controlled based on a preset course, and second automatic steering operation (nav mode) in which the mobile body is controlled so as to head toward a present waypoint.

In the first automatic steering operation, the operation of the steering mechanism 6 is controlled so as to maintain the mobile body on a preset course, for example. The first automatic steering operation can include a mode in which the mobile body is operated while its course is corrected so as to head for a virtual destination on the preset course. Meanwhile, in the second automatic steering operation, the operation of the steering mechanism 6 is controlled so that the mobile body will move along a route that passes a designated waypoint, without a preset course being set.

The GPS receiver 3 receives a positioning signal from a satellite, and outputs longitude and latitude information as position information about the mobile body. The azimuth sensor 4 is a GPS compass or a gyro compass, for example, and senses the orientation of the sensor. When the azimuth sensor 4 is installed so as to be aligned with the heading, the output of the azimuth sensor 4 becomes the heading. If the mobile body is a ship, the above-mentioned course corresponds to the heading. The radar 5 receives reflected microwaves (echoes) emitted to its surroundings, and thereby senses position information about other mobile bodies.

Figure 2:
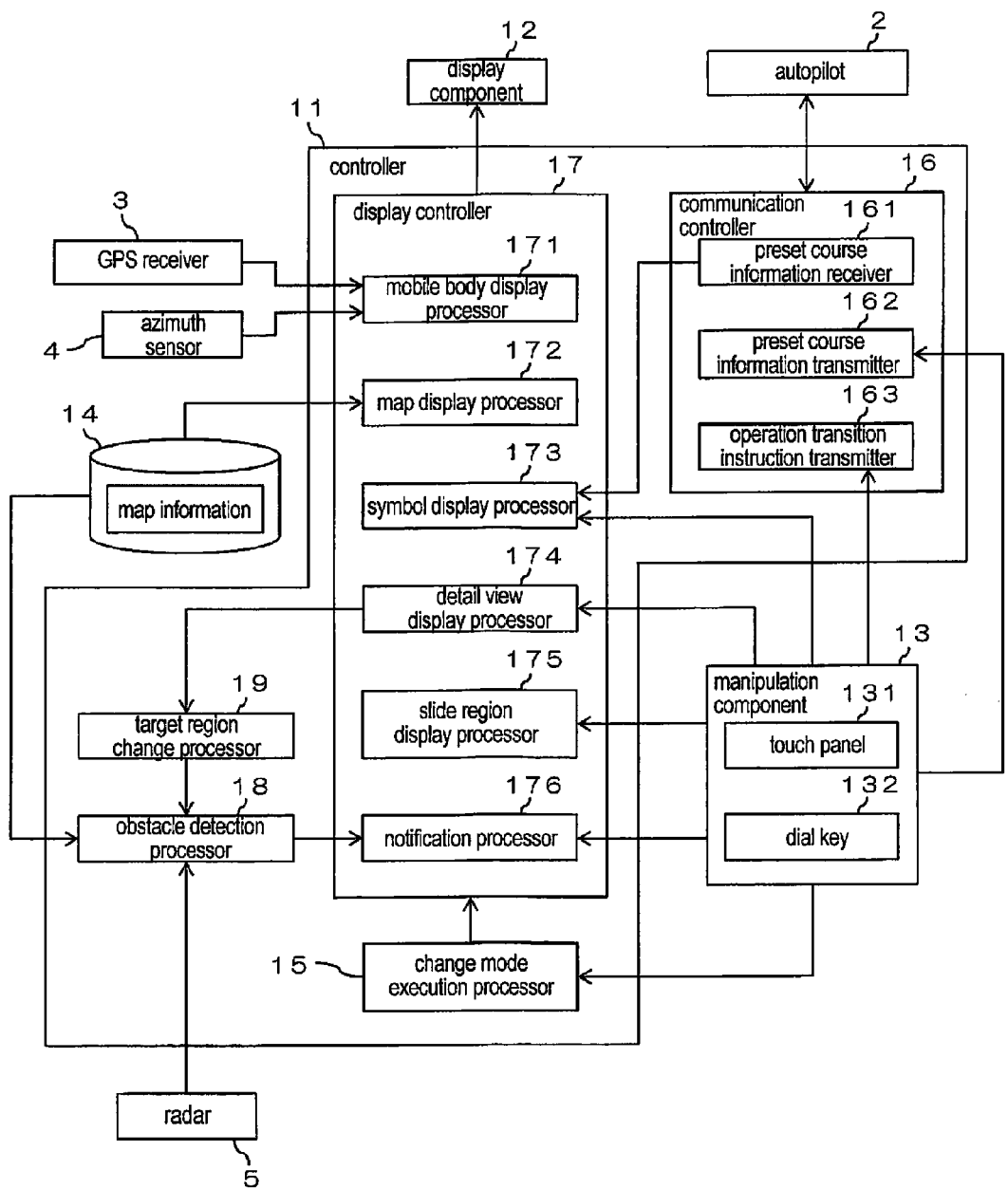
FIG. 2 is a block diagram illustrating the specific configuration of the controller of a plotter.

FIG. 2 is a block diagram illustrating the specific configuration of the controller 11 of the plotter 1. The controller 11 functions as a change mode execution processor 15, a communication controller 16, a display controller 17, an obstacle detection processor 18, and a target region change processor 19 when the CPU executes its program. As shown in FIG. 2, the manipulation component 13 in this embodiment includes a touch panel 131 provided to the display component 12, and a dial key 132 serving as a rotary manipulation component.

In this embodiment, during the first automatic steering operation of the autopilot 2, a change mode is executed for changing preset course information, and the touch panel 131 or the dial key 132 is used during this change mode to change the preset course of the autopilot 2 on the plotter 1 side. The change mode execution processor 15 executes the change mode based on manipulation of the manipulation component 13, and along with this the display controller 17 changes the display image of the display component 12.

The communication controller 16 controls the transmission and reception of signals to and from the autopilot 2. The communication controller 16 includes a preset course information receiver 161, a preset course information transmitter 162, and an operation transition instruction transmitter 163.

The preset course information receiver 161 receives preset course information from the autopilot 2. This preset course information is angle information representing the preset course of the autopilot 2. In this embodiment, the preset course of the autopilot 2 is represented as the absolute bearing by an angle with respect to the north direction, for example, and this angle information is sent from the autopilot 2 to the preset course information receiver 161. However, the preset course can be represented as an absolute bearing based on a direction other than the north direction, and can be represented as a relative bearing.

The preset course information transmitter 162 sends the autopilot 2 the preset course information changed by using the manipulation component 13 in the change mode, and thereby changes the preset course of the autopilot 2. The preset course information sent from the preset course information transmitter 162 is similar to the preset course information received from the autopilot 2 by the preset course information receiver 161 in that it is angle information representing the absolute bearing with respect to the north direction, for example.

The operation transition instruction transmitter 163 sends the autopilot 2 a transition instruction for having the autopilot 2 change from a first automatic steering operation to a second automatic steering operation, based on the use of the manipulation component 13. This transition instruction is sent as a transition instruction instructing that mobile body head toward a predetermined waypoint from the mobile body when the preset course information changed in the change mode is a course heading toward the waypoint. Also, if the manipulation component 13 is used to make a transition from the second automatic steering operation to the first automatic steering operation, the operation transition instruction transmitter 163 sends the autopilot 2 a transition instruction for causing the autopilot 2 to change from the second automatic steering operation to the first automatic steering operation.

Examples of the above-mentioned waypoint include a destination and a veering point, although this is not a comprehensive list. The "veering point" here is a point on a preset route over which the mobile body moves in the second automatic steering operation, which serves as a reference when the mobile body changes its course.

The display controller 17 controls the display on the display screen of the display component 12. The display controller 17 includes a mobile body display processor 171, a map display processor 172, a symbol display processor 173, a detail view display processor 174, a slide region display processor 175, and a notification processor 176.

The mobile body display processor 171 displays the mobile body on the display screen of the display component 12, based on signals received from the GPS receiver 3 and the azimuth sensor 4. The map display processor 172 displays a map on the display screen of the display component 12, based on map information stored in the memory 14. This results in the position and course of the mobile body being displayed on a map on the display screen of the display component 12.

The symbol display processor 173 displays a symbol representing the preset course of the autopilot 2 on the display screen of the display component 12, based on preset course information received by the preset course information receiver 161. In this embodiment, as an example of this symbol, a line is displayed that extends from the mobile body along the preset course. Thus, this symbol is displayed so as to correspond to position information about the mobile body.

The above-mentioned change mode execution processor 15 executes the change mode based on the fact that the symbol displayed on the display screen of the display component 12 has been designated by the manipulation component 13. If the manipulation component 13 is used to perform the change operation in the preset course information during the change mode, the symbol display processor 173 changes the orientation of the symbol representing the preset course. For instance, if the symbol is a line extending from the mobile body along the preset course, the display is changed so that the line extends in a direction corresponding to the changed preset course information.

The detail view display processor 174 displays a detail view of a specific target region that includes the mobile body, on the display screen of the display component 12. Specifically, of the wide-area map information displayed on the display screen of the display component 12, the scale can be expanded for a specific range including the mobile body and displayed on a separate part of the display screen. The display range of the detail view on the display screen of the display component 12 can be changed by using the manipulation component 13. However, displaying a detail view on a separate part of the display screen of the display component 12 is not the only option, and the display on the display screen of the display component 12 can itself be expanded, for example.

The slide region display processor 175 displays on the display screen of the display component 12 a slide region for performing slide operation on the touch panel 131 in the change mode. The slide region is formed of a slender area, for example, and the user can make inputs by touching the touch panel 131 and sliding a finger from one end of this region to the other end. When the user performs the slide operation over the slide region of the touch panel 131, this is accompanied by a change in the display of the slide region.

The notification processor 176 notifies the user of the high probability that the mobile body will collide with an obstacle by displaying a message on the display screen of the display component 12. This notification processor 176 does not have to give its notification by displaying a message on the display screen of the display component 12, and can instead do so by voice or some other means.

The obstacle detection processor 18 detects obstacles present within a specific target region including the mobile body, based on detection signals from the radar 5 and the map information stored in the memory 14. If the mobile body is a ship, examples of obstacles include shoals, land, reefs, and other vessels, although this list is not intended to be comprehensive. The obstacle detection processor 18 can detect not just signals from the radar 5 and map information, but also obstacles based on other information. For instance, the obstacle detection processor 18 can detect obstacles based on meteorological data received by wireless communication with a meteorological data receiver (not shown). Also, the obstacle detection processor 18 can detect obstacles based on depth values. These depth values can be acquired from map information, but they can also be measured with depth finder (not shown).

The notification processor 176 performs notification based on the preset course information changed by using the manipulation component 13 in the change mode, and the detection result obtained by the obstacle detection processor 18. More specifically, if the preset course information changed in the change mode is a course headed for an obstacle detected by the obstacle detection processor 18, then the notification processor 176 notifies the user to that effect.

The target region change processor 19 changes the target region in which the obstacle detection processor 18 detects the presence of obstacles when the manipulation component 13 is used to change the display range of the detail view. Here, the target region of detection by the obstacle detection processor 18 becomes the display range of the detail view after a change. Specifically, the target region change processor 19 makes sure that the target region in which the obstacle detection processor 18 detects obstacles always coincides with the target region in which the detail view display processor 174 displays a detail view on the display screen of the display component 12.

Figure 3:
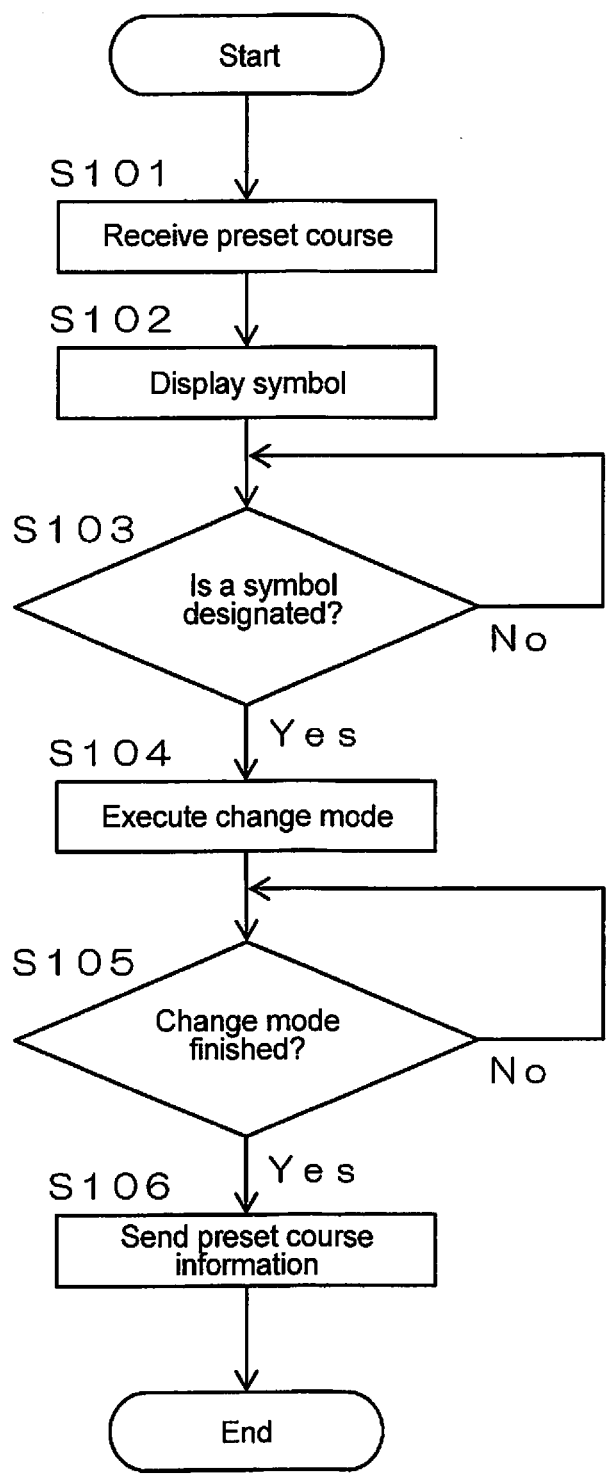
FIG. 3 is a flowchart of an example of the processing performed by the controller pertaining to the transmission and reception of preset course information.

FIG. 3 is a flowchart of an example of the processing performed by the controller 11 pertaining to the transmission and reception of preset course information. The plotter 1 receives preset course information from the autopilot 2 (step S101: preset course information reception step), and displays a symbol on the display screen of the display component 12 based on this preset course information (step S102: symbol display processing step).

If the symbol displayed on the display screen of the display component 12 has been designated with the manipulation component 13 (Yes in step S103), a change mode is executed for changing the preset course information (step S104: change mode execution processing step). After this, once the change mode is finished (Yes in step S105), the preset course information changed in the change mode is sent to the autopilot 2 (step S106: preset course information transmission step).

Figure 4:
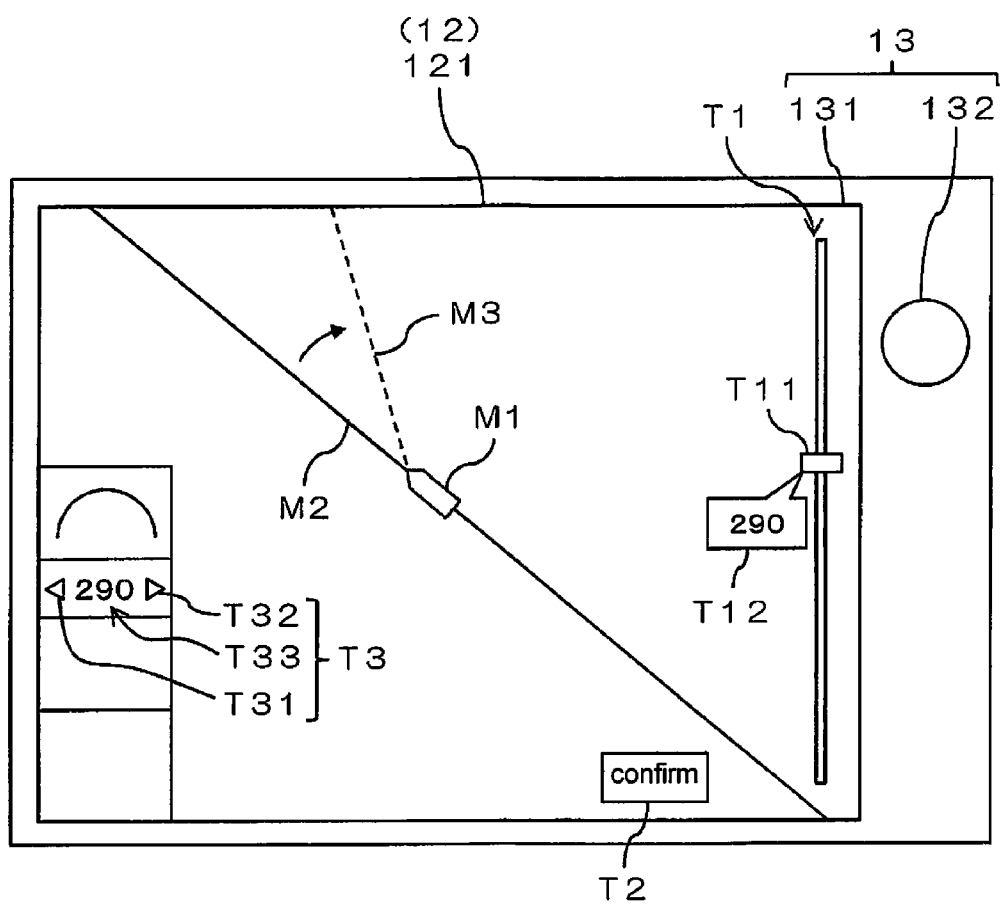
FIG. 4 shows an example of the display on the display screen of the display component in a change mode.

FIG. 4 shows an example of the display on the display screen 121 of the display component 12 in the change mode. A mobile body M1 is displayed on the display screen of the display component 12 based on a signal from the GPS receiver 3. In this example, a case in which the mobile body M1 is a ship will be described. At the scale of the display screen 121 in FIG. 4, the ship (an example of the mobile body M1) is displayed by the actual heading based on a signal from the azimuth sensor 4.

A symbol M2 representing the preset course is displayed on the display screen 121 by a line extending from the mobile body M1 along the preset course. In this embodiment, the symbol M2 displayed on the display screen 121 is designated by a tap operation to the touch panel 131, thereby executing the change mode. This is not the only option, however, and the symbol M2 can instead be designated by operation of a key or a mouse or other such pointing device (not shown) instead of the touch panel 131 at the manipulation component 13.

In the change mode, a slide region T1 is displayed on the display screen 121. The slide region T1 consists of a slender region extending in the vertical direction, for example, and a slide operation can be performed by the user on the touch panel 131 by placing a finger on a slide key T11 displayed within this region, and sliding it in the vertical direction. During the slide operation on the touch panel 131, the position at which the slide key T11 is displayed changes at the same time.

The slide operation discussed above changes the preset course information to angle information corresponding to the position of the slide key T11, and when the change mode then ends, the changed angle information is sent as preset course information to the autopilot 2. In this example, the preset course information (angle information) corresponding to the position of the slide key T11 is displayed as an angle display T12, which corresponds to the slide key T11. The angle information displayed as this angle display T12 also changes simultaneously with the slide operation on the touch panel 131. As a result of this slide operation in the slide region T1 of the touch panel 131, every time the preset course information is changed in the change mode, a symbol M3 is displayed on the display screen 121 in an orientation corresponding to the changed preset course information. A configuration in which only the preset course information that was last changed in a slide operation in the slide region T1 in the change mode is sent to the autopilot 2 at the end of the change mode is not the only option, and instead the changed preset course information can be sent consecutively to the autopilot 2 every time the preset course information is changed in the change mode, for example.

The preset course information can also be changed by performing a drag operation of the symbol M2, in addition to using the slide region T1 in the change mode. Specifically, the user places a finger on the touch panel 131 at the position of the symbol M2 and slides the finger in the desired direction, and then lifts the finger from the touch panel 131 so as to designate the position where the finger left the screen. This drag operation of the symbol M2 results in a line that links the mobile body M1 and the position where the finger left the screen being displayed on the display screen 121 as the symbol M3 in an orientation corresponding to the changed preset course information, every time the preset course information is changed in the change mode. A configuration in which only the preset course information that was last changed by the drag operation of the symbol M2 in the change mode is sent to the autopilot 2 at the end of the change mode is not the only option, and instead the changed preset course information can be sent consecutively to the autopilot 2 every time the preset course information is changed in the change mode, for example.

Furthermore, by performing a rotation operation of the dial key 132 during the change mode, the symbol M3 is displayed in an orientation corresponding to the changed preset course information on the display screen 121. For instance, if the dial key 132 is turned to the right, the preset course information changes by an angle corresponding to the amount of rotation to the right with respect to the preset course prior to the change. On the other hand, if the dial key 132 is turned to the left, the preset course information changes by an angle corresponding to the amount of rotation to the left with respect to the preset course prior to the change. This rotation operation of the dial key 132 results in the symbol M3 being displayed on the display screen 121 in an orientation corresponding to the changed preset course information, every time the preset course information is changed in the change mode. A configuration in which only the preset course information that was last changed by the rotation operation of the dial key 132 in the change mode is sent to the autopilot 2 at the end of the change mode is not the only option, and instead the changed preset course information can be sent consecutively to the autopilot 2 every time the preset course information is changed in the change mode, for example.

In this example, it is also possible to change the preset course information by performing a touch operation to a key manipulation region T3 displayed on the display screen 121. This key manipulation region T3 is displayed on the display screen 121 even when not in the change mode, and the same operation as that with the autopilot 2 can be performed on the plotter 1 side.

More specifically, the key manipulation region T3 includes a left designation key T31 and a right designation key T32 as soft keys. The preset course information is changed by an angle corresponding to the number of times the left designation key T31 or the right designation key T32 is tapped. The changed preset course information (angle information) is displayed as an angle display T33 in the key manipulation region T3.

In this embodiment, the symbol M3 is displayed in different ways depending on whether or not the change mode is in effect. For example, in the change mode, the symbol M3 is displayed as a broken line as shown in FIG. 4, and when the change mode then ends and the changed preset course information is given, the symbol M3 is displayed as a solid line. The change mode ends after a specific amount of time has passed, or by instruction inputted with the touch panel 131 using a confirmation key T2 displayed on the display screen 121.

Also, in this embodiment, if an operation for changing the preset course information is performed in the change mode, not only the symbol M3 corresponding to the changed preset course information, but also the symbol M2 corresponding to the preset course information prior to the change is left displayed on the display screen 121. This allows the user to confirm a change in the preset course with a quick glance.

As discussed above, in this embodiment preset course information can be changed in a plurality of ways in the change mode, but regardless of how it is changed, the position of the slide key T11 and the angle information about the angle displays T12 and T33 correspond to changed preset course information. After the preset course information has been changed, the course of the mobile body M1 (the heading in the case of a ship) gradually approaches the changed preset course under the automatic steering of the autopilot 2.

Figure 5:
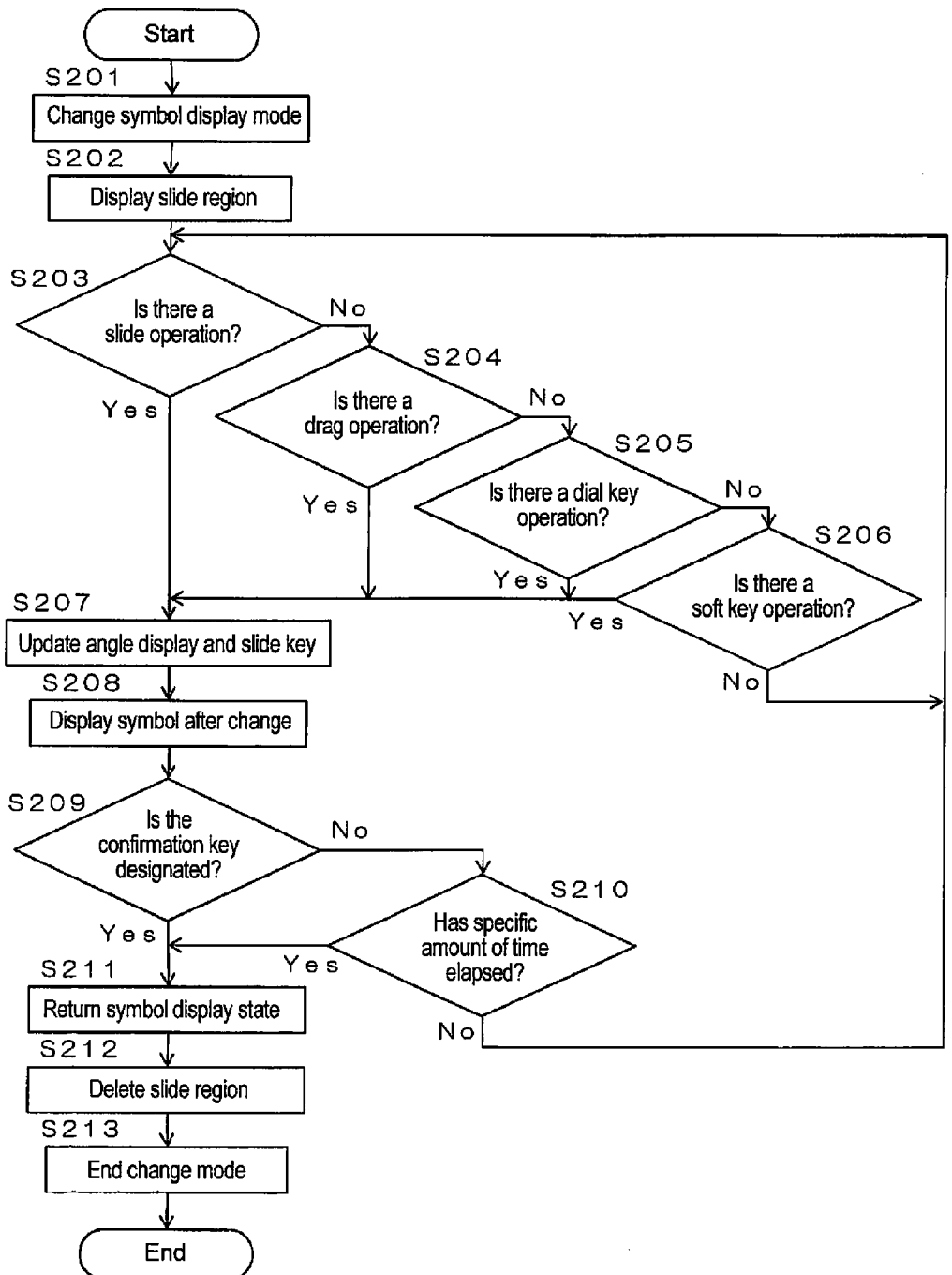
FIG. 5 is a flowchart of an example of the processing performed by the controller pertaining to the display of a symbol in the change mode.

FIG. 5 is a flowchart of an example of the processing performed by the controller 11 pertaining to the display of the symbol M3 in the change mode. When the change mode begins, first the symbol M3 is displayed on the display screen 121 in a different way from that of the symbol M2 corresponding to the preset course information prior to the change, which is indicated by a change from a solid line to a broken line, for example (step S201). The slide region T1 is also displayed on the display screen 121 (step S202; slide region display processing step).

After this, if the preset course information is changed by performing the slide operation on the touch panel 131 in the slide region T1 (Yes in step S203), the angle information about the angle displays T12 and T33 and the position of the slide key T11 are changed so as to correspond to the changed preset course information (step S207).

Then, the symbol M3 is displayed so as to correspond to the changed preset course information (step S208; symbol display processing step), and the orientation of the symbol M3 representing the preset course corresponds to the changed preset course information. At this point, the symbol M2 corresponding to the preset course information prior to the change is left displayed by a solid line on the display screen 121.

The processing of step S207 and S208 is similarly carried out if the drag operation of the symbol M3 is performed (Yes in step S204), if the rotation operation of the dial key 132 is performed (Yes in step S205), or if the tap operation of the soft key in the key manipulation region T3 is performed (Yes in step S206).

After this, if the confirmation key T2 displayed on the display screen 121 is designated by the tap operation of the touch panel 131 (Yes in step S209), or if a specific amount of time has passed since the operation in any of steps S203 to S206 (Yes in step S210), then the operation for changing the preset course information is ended. The processing of steps S203 to S210 is repeated until the operation for changing the preset course information is ended.

When the operation for changing the preset course information is finished, the symbol M3 displayed by a broken line on the display screen 121 in an orientation corresponding to the changed preset course information returns to a state of being displayed by a solid line (step S211). At this point, the symbol M2 corresponding to the preset course information prior to the change is deleted from the display screen 121. The slide region T1 displayed on the display screen 121 is also deleted (step S212), and the change mode comes to an end (step S213).

When the change mode ends, as discussed above, the preset course information that was changed in the change mode is sent to the autopilot 2 (step S106 in FIG. 3: preset course information transmission step). Specifically, in the change mode, if a specific amount of time has elapsed since the operation in which the preset course information was changed with the manipulation component 13 (steps S203 to S206) (Yes in step S210), the changed preset course information at that point is sent to the autopilot 2. On the other hand, if an instruction to send the preset course information to the autopilot 2 has been given by designation with the confirmation key T2 before the above-mentioned specific amount of time has elapsed (Yes in step S209), the changed preset course information at that point is sent to the autopilot 2.

As mentioned above, in this embodiment the preset course information from the autopilot 2 is received by the plotter 1, and the symbol M2 representing the preset course is displayed, so as to correspond to position information about the mobile body M1, on the display screen 121 of the plotter 1 that is displaying position information about the mobile body M1 along with map information. Accordingly, the user can intuitively grasp the preset course of the autopilot 2 by looking at the display screen 121 of the plotter 1.

Also, the user can easily execute a change mode for changing the preset course information by using the manipulation component 13 to designate the symbol M2 displayed on the display screen 121. When the user changes the preset course information in the change mode, that preset course information can be sent to the autopilot 2, and the preset course of the autopilot 2 changed. In the change mode, if the user performs the change operation in the preset course information with the manipulation component 13, the orientation of the symbol M3 representing the preset course will be changed, so the user can intuitively grasp the preset course of the autopilot 2 after the change.

Thus, the user can intuitively confirm the preset course of the autopilot 2 before and after the change by looking at the symbols M2 and M3 displayed on the display screen 121 of the plotter 1. Therefore, the work of changing the preset course in the autopilot 2 can be carried out more smoothly than with a conventional configuration in which the preset course is changed by using the manipulation component of the autopilot 2.

Also, if an obstacle should be discovered in the course of the mobile body M1, for example, the user can easily execute the change mode by using the manipulation component 13 to designate the symbol M2 displayed on the display screen 121, and change to the proper preset course information while looking at the symbol M3 on the display screen 121, which is intuitively easy to understand. Consequently, a change to the proper preset course information can be made in less time, so there is less risk that the mobile body M1 will collide with the obstacle.

In particular, in this embodiment, the user can execute the change mode by using the touch panel 131 to easily designate the symbol M2 displayed on the display screen 121. Therefore, even in an emergency, such as when the user discovers an obstacle in the course of the mobile body M1, the user can quickly execute the change mode with simple manipulation and change the preset course information, and the danger that the mobile body M1 will collide with the obstacle can be effectively reduced.

Also, in this embodiment, the user can easily perform the change operation in the preset course information by the sliding operation in the slide region T1, the drag operation of the symbol M2, or the rotation operation of the dial key 132.

Since each of these operations results in a change in the orientation of the symbol M3 representing the preset course, the user can readily confirm the preset course of the autopilot 2 after the change, and the work of changing the preset course of the autopilot 2 can be made smoother. In particular, the user can perform the rotation operation of the dial key 132 smoothly even if the mobile body M1 is rocking violently, etc.

Furthermore, in this embodiment, the user can further change the preset course information within a specific amount of time since the manipulation component 13 was used to perform the change operation in the preset course information (up until the answer is Yes in step S210 in FIG. 5). Consequently, if the preset course information that was initially changed is not right, the preset course information can be prevented from being sent immediately to the autopilot 2, and the preset course information can instead be changed so that the proper preset course information is sent to the autopilot 2. When the manipulation component 13 is used to perform the change operation in the preset course information, the user can check whether or not the changed preset course information has been sent to the autopilot 2 by displaying a confirmation window or the like on the display screen 121.

Meanwhile, if the user uses the manipulation component 13 to send preset course information to the autopilot 2 (Yes in step S209 in FIG. 5), then even though the above-mentioned specific amount of time has not yet elapsed, the preset course information changed at that point can be sent to the autopilot 2. Accordingly, the work of changing the preset course of the autopilot 2 can be made smoother.

Figure 6:
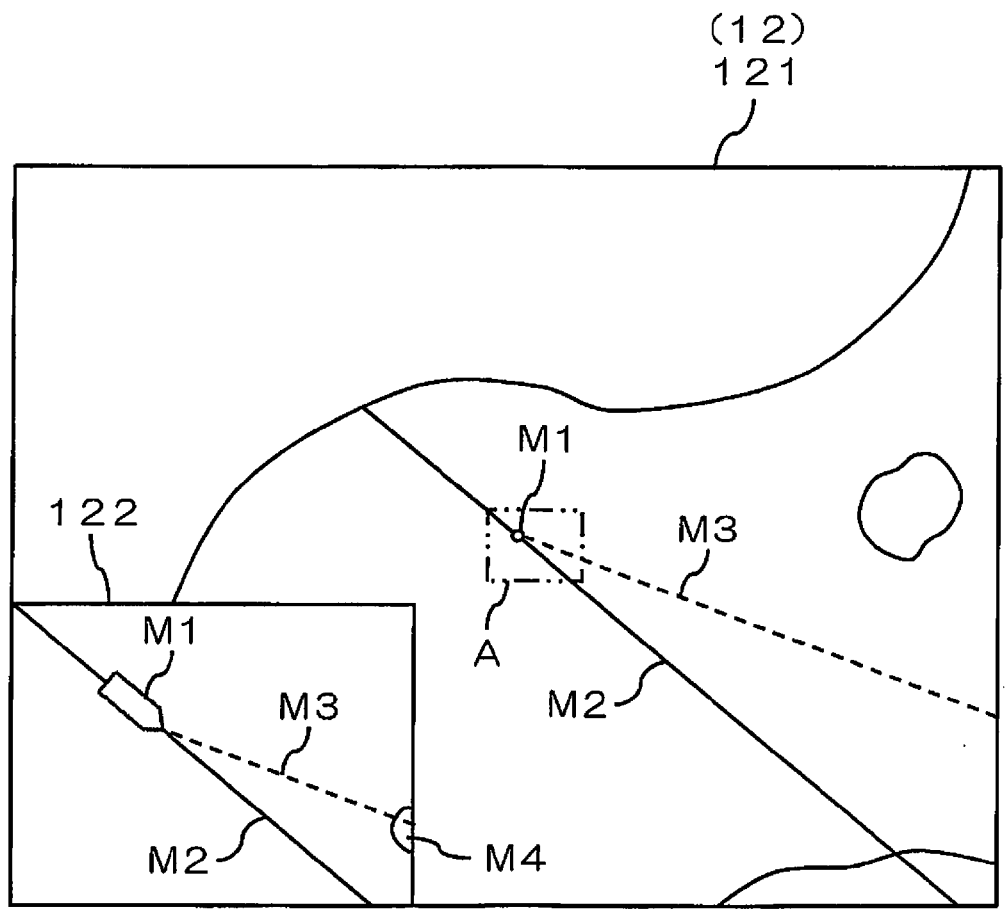
FIG. 6 shows an example of the display on the display screen of the display component when the preset course information changed in the change mode is a course headed for an obstacle.

FIG. 6 shows an example of the display on the display screen 121 when the preset course information changed in the change mode is a course headed for an obstacle M4. In this example, a detail view 122 of a specific target region A including the mobile body M1 is displayed on the display screen 121 as a separate screen (sub screen). The target region A is displayed in the detail view 122 in enlarged scale in the wide-area map information displayed on the display screen 121. The position of the target region A changes as the mobile body M1 moves.

As shown in FIG. 6, since small objects are displayed enlarged in the detail view 122, the situation around the mobile body M1 can be more accurately assessed. If the preset course information changed in the change mode is a course headed for the obstacle M4, then as shown in the detail view 122, the symbol M3 corresponding to the changed preset course information is displayed superposed with the obstacle M4.

In this embodiment, as discussed above, if the preset course information changed in the change mode is a course headed for the obstacle M4, the notification processor 176 changes the color of the symbol M3 to alert the user to the fact that there is a high risk that the mobile body M1 will collide with the obstacle M4. The notification to the user by the notification processor 176 is not limited to changing the color of the symbol M3, and can be accomplished by some other means.

Figure 7:
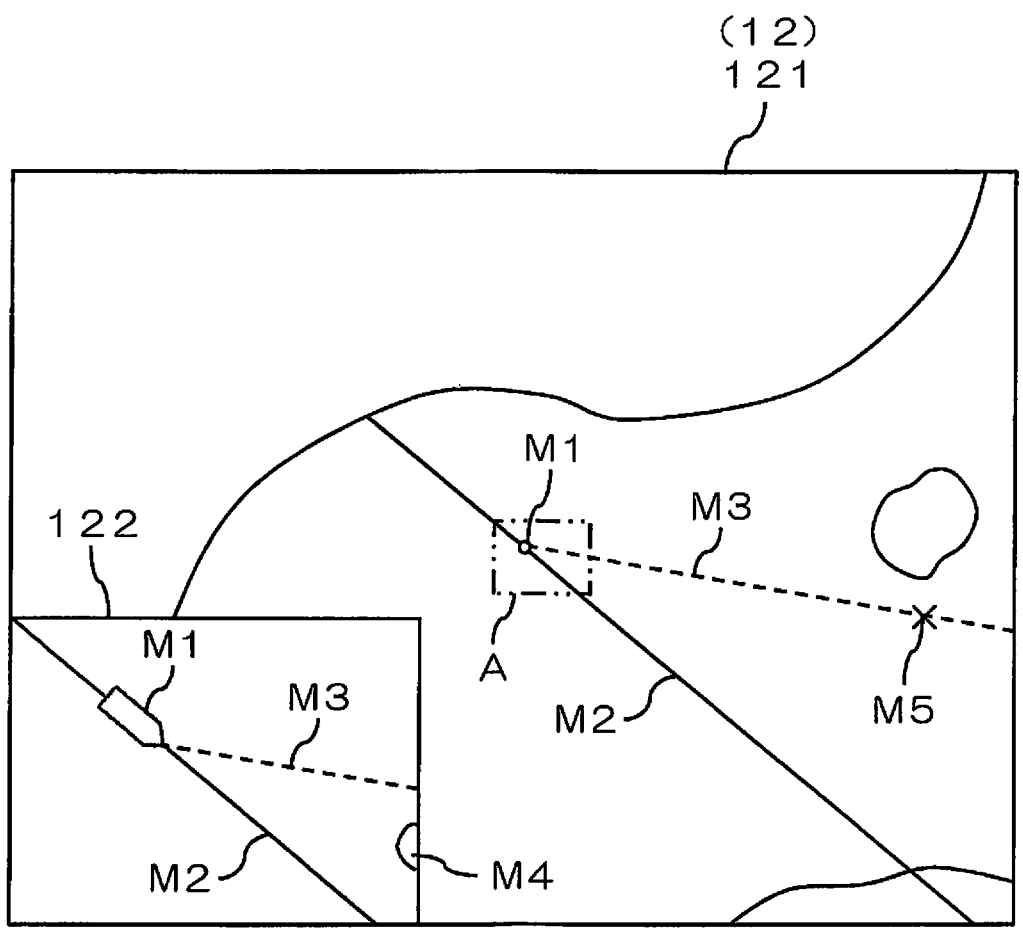
FIG. 7 shows an example of the display on the display screen of the display component when the preset course information changed in the change mode is a course headed for the destination.

FIG. 7 shows an example of the display on the display screen 121 of the display component 12 when the preset course information changed in the change mode is a course headed for a destination M5. If the preset course information changed in the change mode is a course headed for the obstacle destination M5, the as shown in FIG. 7, the symbol M3 corresponding to the changed preset course information is displayed superposed with the destination M5.

In this embodiment, as discussed above, if the preset course information that was changed in the change mode is a course headed for the destination M5, a transition instruction for transitioning from the first automatic steering operation to the second automatic steering operation is sent to the autopilot 2 so that the mobile body M1 will be headed toward the destination M5. Furthermore, if the preset course information that was changed in the change mode is a course headed for the destination M5, the user can check whether or not a transition instruction for transitioning from the first automatic steering operation to the second automatic steering operation has been sent to the autopilot 2 by displaying a confirmation window or the like on the display screen 121. Meanwhile, if the preset course information is changed during the second automatic steering operation, which is headed toward the destination M5, to a course headed for something other than the waypoint, the user can confirm whether or not a transition instruction for transitioning from the second automatic steering operation to the first automatic steering operation is to be sent to the autopilot 2. Also, if the preset course information is changed during the second automatic steering operation, which is headed toward the destination M5, to a course headed for another waypoint, the user can confirm whether or not to change the destination in the second automatic steering operation.

However, when the preset course information is changed by the drag operation of the symbol M2, the configuration can be such that a transition instruction for the mobile body M1 to head for the destination M5 is sent to the autopilot 2, or a confirmation window or the like is displayed on the display screen 121, only when the user touches a finger to the touch panel 131 at the position of the symbol M2 and slides it in the desired direction, after which the position where the finger left the touch panel 131 is the destination M5. On the other hand, when the preset course information is changed by the drag operation during the second automatic steering operation headed for the destination M5, and the position where the finger left the touch panel 131 is something other than a waypoint, then a transition instruction for transitioning from the second automatic steering operation to the first automatic steering operation can be sent to the autopilot 2, or a confirmation window or the like for confirming whether or not to transition from the second automatic steering operation to the first automatic steering operation can be displayed on the display screen 121. Also, when the preset course information is changed by the drag operation during the second automatic steering operation headed for the destination M5, and the position where the finger left the touch panel 131 is another waypoint, then a change instruction for changing the destination in the second automatic steering operation can be sent to the autopilot 2, or a confirmation window or the like for confirming whether or not to change the destination in the second automatic steering operation can be displayed on the display screen 121.

Figure 8:
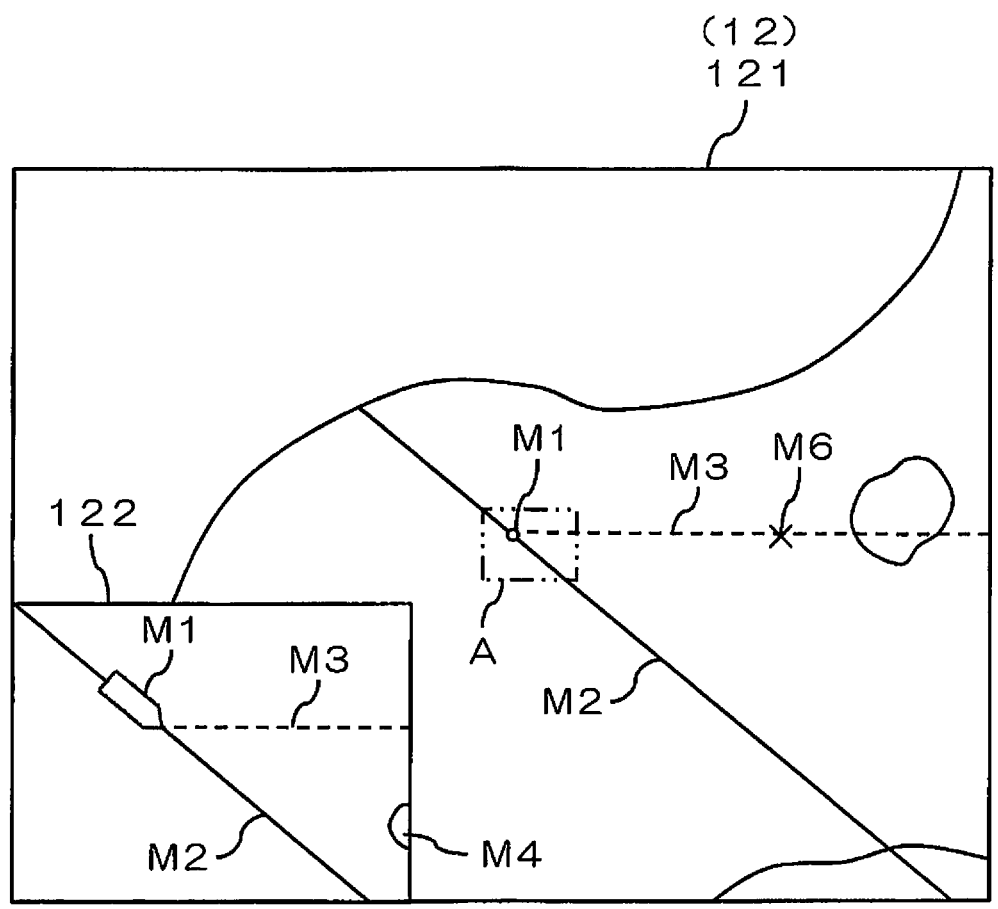
FIG. 8 shows an example of the display on the display screen of the display component when the preset course information changed in the change mode is a course headed for a waypoint.
Figure 9:
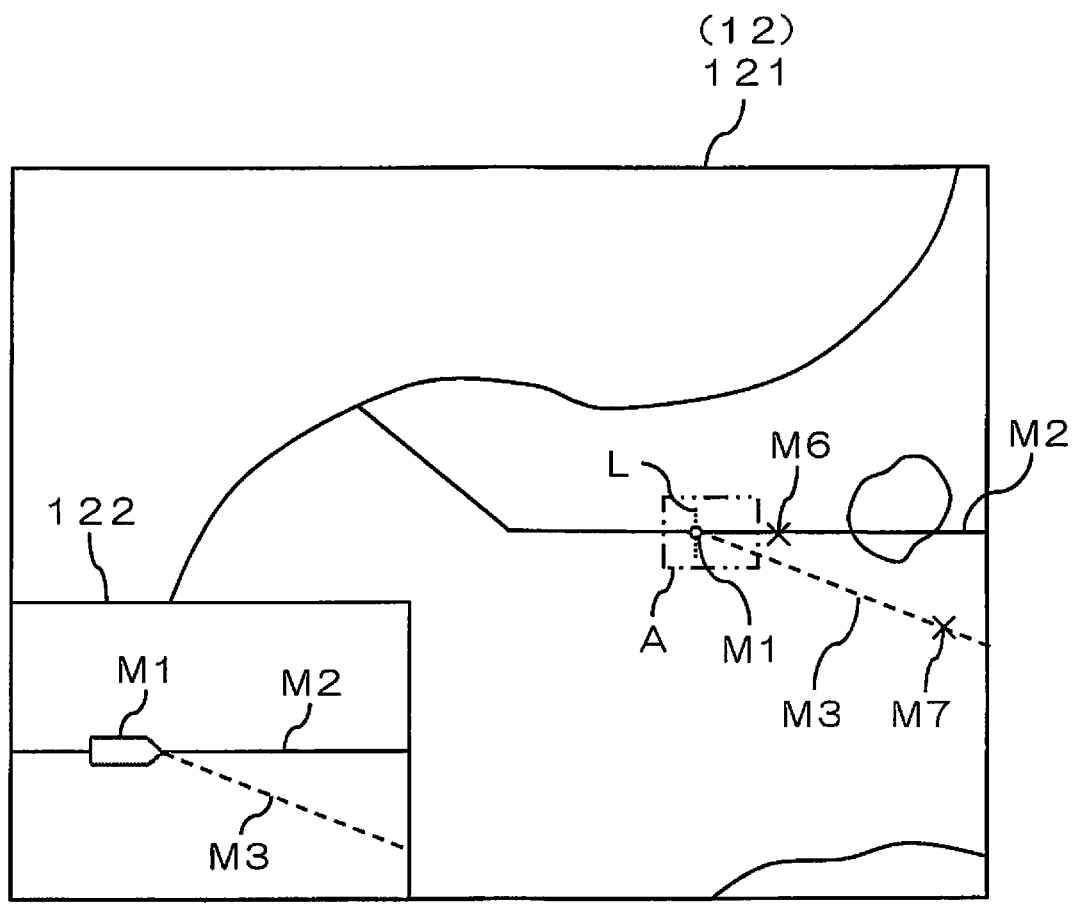
FIG. 9 shows an example of the display on the display screen of the display component when the preset course information changed in the change mode is a course headed for a waypoint.

FIGS. 8 and 9 show an example of the display on the display screen 121 when the preset course information changed in the change mode is a course headed for a veering point M6. If the changed preset course information changed in the change mode is a course headed for the veering point M6, then as shown in FIG. 8, the symbol M3 corresponding to the preset course information after the change is displayed superposed with the veering point M6.

In this embodiment, as discussed above, when the preset course information changed in the change mode is a course headed for the veering point M6, a transition instruction for transitioning from the first automatic steering operation to the second automatic steering operation is sent to the autopilot 2 so that the mobile body M1 will be headed for the veering point M6. After this, the symbol M3 corresponding to the changed preset course information is displayed as the symbol M2 representing the preset course as shown in FIG. 9, and the mobile body M1 changes its course for the veering point M6. When the preset course information changed in the change mode is a course headed for the veering point M6, a confirmation window or the like can be displayed on the display screen 121 so that the user can check whether or not to send the autopilot 2 a transition instruction for transitioning from the first automatic steering operation to the second automatic steering operation. Meanwhile, when the preset course information is changed to a course headed for something other than a waypoint during the second automatic steering operation headed for the veering point M6, the user can confirm whether or not to send the autopilot 2 a transition instruction for transitioning from the second automatic steering operation to the first automatic steering operation. Also, when the preset course information is changed to a course headed for another waypoint during the second automatic steering operation headed for the veering point M6, the user can confirm whether or not to change the destination in the second automatic steering operation.

However, when the preset course information is changed by the drag operation of the symbol M2, the configuration can be such that a transition instruction for the mobile body M1 to head for the veering point M6 is sent to the autopilot 2, or a confirmation window or the like is displayed on the display screen 121, only when the user touches a finger to the touch panel 131 at the position of the symbol M2 and slides it in the desired direction, after which the position where the finger left the touch panel 131 is the veering point M6. On the other hand, when the preset course information is changed by the drag operation during the second automatic steering operation headed for the veering point M6, and the position where the finger left the touch panel 131 is something other than a waypoint, then a transition instruction for transitioning from the second automatic steering operation to the first automatic steering operation can be sent to the autopilot 2, or a confirmation window or the like for confirming whether or not to transition from the second automatic steering operation to the first automatic steering operation can be displayed on the display screen 121. Also, when the preset course information is changed by the drag operation during the second automatic steering operation headed for the veering point M6, and the position where the finger left the touch panel 131 is another waypoint, then a change instruction for changing the destination in the second automatic steering operation can be sent to the autopilot 2, or a confirmation window or the like for confirming whether or not to change the destination in the second automatic steering operation can be displayed on the display screen 121.

When a transition instruction for transitioning to the second automatic steering operation so that the mobile body M1 will be headed for the veering point M6 has been sent to the autopilot 2, a veering commencement line L is set more to the mobile body M1 side than the veering point M6. This veering commencement line L is perpendicular to a line connecting the mobile body M1 and the veering point M6, for example (the symbol M2 in FIG. 9).

After this, when the mobile body M1 has passed the veering commencement line L, the veering point is changed to the next veering point M7 preset on a route that passes through the veering point M6, and an instruction signal is sent to the autopilot 2 so that the mobile body M1 will be headed for this veering point M7. At this point, the preset course information is changed, and the symbol M3 corresponding to the preset course information after the change is displayed superposed with the veering point M7. Consequently, the mobile body M1 that has passed the veering commencement line L changes its course for the veering point M7.

Figure 10:
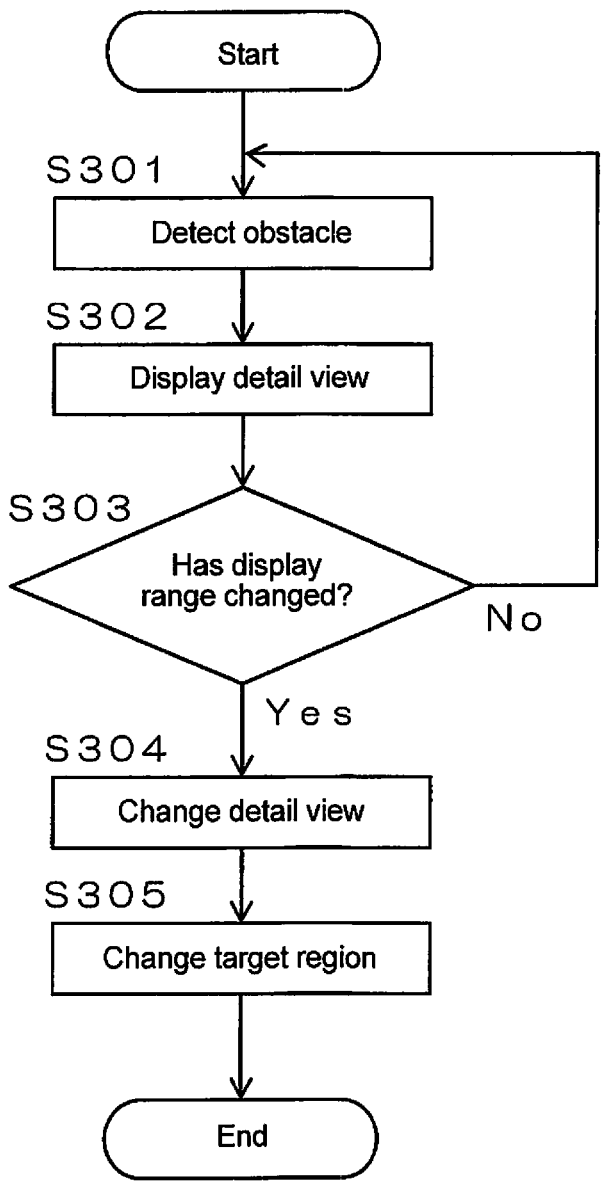
FIG. 10 is a flowchart of an example of the processing performed by the controller pertaining to the display of a detail view in the change mode.

FIG. 10 is a flowchart of an example of the processing performed by the controller 11 pertaining to the display of the detail view 122 in the change mode. In the change mode, the sensor is constantly looking for an obstacle M4 within the specific target region A including the mobile body M1, based on the detection signal from the radar 5 and the map information stored in the memory 14 (step S301: obstacle detection processing step). If there is an obstacle M4 within the target region A, a detail view 122 of the target region A is displayed on the display screen 121, including the relative positional relation between the obstacle M4 and the mobile body M1 (step S362: detail view display processing step).

The display range of the detail view 122 can be changed with the manipulation component 13. For example, if a pitch-out operation is performed on the touch panel 131 in the detail view 122, the scale of the detail view 122 is enlarged, but if a pitch-in operation is performed, the scale of the detail view 122 is reduced. However, changing the display range of the detail view 122 is not limited to a pitch-out or pitch-in operation on the touch panel 131, and can instead be accomplished by some other operation, such as the operation of an enlarge/reduce button.

Thus, when an operation has been performed to change the display range of the detail view 122 (Yes in step S303), the display of the detail view 122 is changed (step S304), and the target region A, which is the range over which the obstacle M4 is detected, is changed to the display range of the detail view 122 after the change (step S305: target region change processing step).

In this embodiment, since the detail view 122 corresponding to the target region A, which is the range over which the obstacle M4 is detected, is displayed on the display screen 121, it is easier to confirm that an obstacle M4 has been detected (see FIG. 6). Also, if the user performs an operation with the manipulation component 13 to change the display range of the detail view 122, the target region A will have the display range of the detail view 122 after the change, so the range over which the obstacle M4 is detected can be easily changed. Therefore, the work of changing the preset course of the autopilot 2 can be made smoother.

Figure 11:
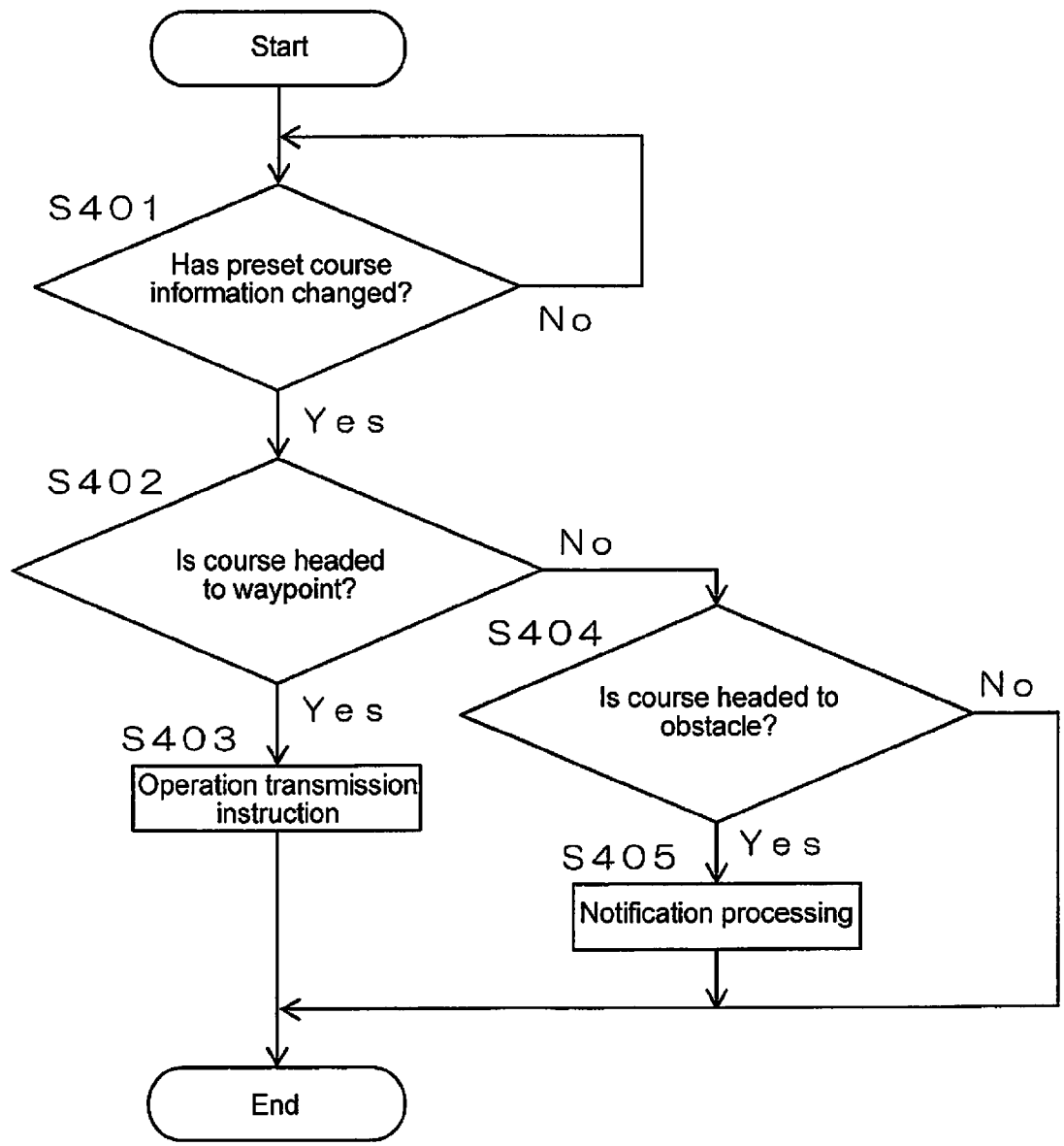
FIG. 11 is a flowchart of an example of the processing performed by the controller when there was a change in the preset course information in the change mode.

FIG. 11 is a flowchart of an example of the processing performed by the controller 11 when there was a change in the preset course information in the change mode. When the manipulation component 13 is used to change the preset course information in the change mode (Yes in step S401), if the preset course information after the change is a course headed for a predetermined waypoint such as the destination M5 or the veering point M6 (Yes in step S402), an transition instruction for transitioning to the second automatic steering operation so that the mobile body M1 will be headed for that waypoint is sent to the autopilot 2 (step S403: operation transition instruction transmission step). However, if the preset course information has been changed by the drag operation of the symbol M2, the configuration can be such that a transition instruction so that the mobile body M1 will be headed for the waypoint will be sent to the autopilot 2 only when the user has touched a finger to the touch panel 131 at the position of the symbol M2 and slid it in the desired direction, after which the position where the finger left the touch panel 131 is that waypoint.

On the other hand, when the preset course information after the change is a course headed for the obstacle M4 detected in step S301 in FIG. 10 (Yes in step S404), the user is notified to that effect (step S405: notification processing step). An example of how this notification is given is to change the display mode of the symbol M3, such as changing the color of the symbol M3 corresponding to preset course information after the change. In this case, the configuration can be such that the display mode of the symbol M3 is maintained in its changed state regardless of whether or not change mode is in effect.

Thus, in this embodiment, the user can switch to the second automatic steering operation so that the mobile body M1 is headed for a waypoint predetermined from the mobile body M1 by executing the change mode in the first automatic steering operation and changing the preset course information to a course this waypoint. At this point, the user can easily change the preset course information to a course headed to the desired waypoint by changing the preset course information while looking at the symbol M3 displayed on the display screen 121 of the plotter 1. This makes the job of changing the preset course of the autopilot 2 smoother.

Also, in this embodiment, when an obstacle M4 is detected in a specific target region A including the mobile body M1, and the preset course information is changed to a course headed for this detected obstacle M4, the user can be notified to that effect. Consequently, the user can be forewarned that there is a high risk that the mobile body M1 will collide with the obstacle M4. Upon confirming this notification, the user can change the preset course information again to reduce the risk that the mobile body M1 will collide with the obstacle M4.

In the above embodiment, a configuration was described in which a line extending from the mobile body M1 along the preset course was displayed on the display screen 121 as the symbols M2 and M3 representing the preset course of the autopilot 2. This configuration is not the only option, however, and the symbols M2 and M3 can be displayed on the display screen 121 in any mode, such as using an icon or mark other than a line.

Also, the operation of designating the mobile body M1, the symbols M2 and M3, and the keys T2, T11, T31, and T32 displayed on the display screen 121 is not limited to an operation performed on the touch panel 131. For instance, the configuration can be such that the operation is performed on a hard key (not shown) provided separately from the touch panel 131. Thus, the manipulation component 13 is not limited to the touch panel 131 and the dial key 132, and can include various other kinds of key.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An information display device configured to display position information of a mobile body along with map information on a display screen of a display component and configured to transmit a signal to an automatic steering device based on an operation of a manipulation component, the information display device comprising:
   a preset course information receiver configured to receive preset course information from the automatic steering device;
   a symbol display processor configured to display a symbol representing a preset course on the display screen so as to correspond to the position information of the mobile body based on the preset course information received by the preset course information receiver;
   a change mode execution processor configured to execute a change mode for changing the preset course information based on a fact that the symbol displayed on the display screen has been designated with the manipulation component; and
   a preset course information transmitter configured to transmit the preset course information changed during the change mode to the automatic steering device,
   the symbol display processor being further configured to change an orientation of the symbol representing the preset course according to a change operation in the preset course information with the manipulation component during the change mode.

2. The information display device according to claim 1, further comprising
   an operation transition instruction transmitter configured to transmit a transition instruction about an operating mode of the automatic steering device according to whether or not the changed preset course information is a course headed for a preset waypoint.

3. The information display device according to claim 1, further comprising
   an obstacle detection processor configured to detect an obstacle present in a specific target region that includes the mobile body, and
   a notification processor configured to notify a user when the preset course information changed during the change mode is a course headed for the obstacle detected by the obstacle detection processor.

4. The information display device according to claim 1, wherein
the manipulation component includes a touch panel, and
the change mode execution processor is further configured to execute the change mode based on a fact that the symbol displayed on the display screen has been designated by an operation of the touch panel.

5. The information display device according to claim 1, wherein
the manipulation component includes a rotary manipulation component with which an amount of operation varies according to a rotation operation, and
the symbol display processor is configured to changes the orientation of the symbol representing the preset course in response to the rotation operation of the rotary manipulation component during the change mode.

6. The information display device according to claim 1, wherein
the preset course information transmitter is further configured to transmit the changed preset course information to the automatic steering device when a specific amount of time has elapsed since the manipulation component is used to perform the change operation in the preset course information during the change mode.

7. The information display device according to claim 1, wherein
the preset course information transmitter is further configured to transmit the changed preset course information to the automatic steering device when the manipulation component has sent an instruction to transmit the preset course information to the automatic steering device after the manipulation component has been used to perform the change operation in the preset course information during the change mode.

8. The information display device according to claim 2, wherein,
the operation transition instruction transmitter is further configured to transmit the transition instruction about the operating mode according to whether or not a position where a finger has left the symbol is the waypoint when the preset course information has been changed by a drag operation of the symbol during the change mode.

9. The information display device according to claim 2, further comprising
an obstacle detection processor configured to detect an obstacle present in a specific target region that includes the mobile body, and
a notification processor configured to notify a user when the preset course information changed during the change mode is a course headed for the obstacle detected by the obstacle detection processor.

10. The information display device according to claim 3, further comprising
a detail view display processor configured to display a detail view of the target region on the display screen, and
a target region change processor configured to set a display range of the detail view to the target region when the manipulation component has been manipulated to change the display range of the detail view.

11. The information display device according to claim 4, further comprising
a slide region display processor configured to display on the display screen a slide region in which the preset course information is changed by a slide operation on the touch panel,
the symbol display processor being further configured to change the orientation of the symbol representing the preset course in response to the slide operation in the slide region.

12. The information display device according to claim 4, wherein
the symbol display processor is further configured to change the orientation of the symbol representing the preset course in response to a drag operation of the symbol during the change mode.

13. The information display device according to claim 8, further comprising
an obstacle detection processor configured to detect an obstacle present in a specific target region that includes the mobile body, and
a notification processor configured to notify a user when the preset course information changed during the change mode is a course headed for the obstacle detected by the obstacle detection processor.

14. The information display device according to claim 9, further comprising
a detail view display processor configured to display a detail view of the target region on the display screen, and
a target region change processor configured to set a display range of the detail view to the target region when the manipulation component has been manipulated to change the display range of the detail view.

15. The information display device according to claim 13, further comprising
a detail view display processor configured to display a detail view of the target region on the display screen, and
a target region change processor configured to set a display range of the detail view to the target region when the manipulation component has been manipulated to change the display range of the detail view.

16. A course setting method comprising:
a preset course information reception step of receiving preset course information from an automatic steering device;
a symbol display processing step of displaying a symbol representing a preset course on a display screen of a display component so as to correspond to position information of a mobile body based on the preset course information received in the preset course information reception step;
a change mode execution processing step of executing a change mode for changing the preset course information based on a fact that the symbol displayed on the display screen has been designated by a manipulation component; and
a preset course information transmission step of transmitting the preset course information changed during the change mode to the automatic steering device,
in the symbol display processing step, an orientation of the symbol representing the preset course being changed in response to a change operation in the preset course information with the manipulation component during the change mode.

* * * * *